(12) United States Patent
Randolph

(10) Patent No.: US 6,348,248 B1
(45) Date of Patent: Feb. 19, 2002

(54) NOISEMAKER PARTY FAVOR WITH REMOVABLE GRAPHICS

(76) Inventor: Christine Randolph, 25922 Poland Rd., Chantilly, VA (US) 20152

( * ) Notice: Subject to any disclaimer, the term of this patent is extended or adjusted under 35 U.S.C. 154(b) by 0 days.

(21) Appl. No.: 09/421,554

(22) Filed: Oct. 20, 1999

(51) Int. Cl.[7] .................................................. B32B 3/12
(52) U.S. Cl. ....................... 428/40.1; 283/81; 428/42.1; 428/156; 428/158; 428/178; 428/192; 428/202; 428/203
(58) Field of Search ................................ 428/40.1, 40.2, 428/42.1, 156, 158, 178, 192, 202, 203; 283/81

(56) References Cited

U.S. PATENT DOCUMENTS

| 1,622,606 | A | | 3/1927 | Palmer |
| 4,911,671 | A | * | 3/1990 | Rogers ........................ 446/81 |
| 5,639,523 | A | | 6/1997 | Ellis |
| 5,830,037 | A | | 11/1998 | Mastandrea, Jr. |

* cited by examiner

Primary Examiner—Nasser Ahmad
(74) Attorney, Agent, or Firm—David G. Grossman

(57) ABSTRACT

A party favor is disclosed that integrates a noise-making article with removable graphics for the purpose of proving amusement. This party favor is a lamination of several layers generally including but not limited to a noise making cellular sheet material layer, an adhesive layer and a graphic layer. The cells of the noise making cellular sheet material layer may be popped to produce a multitude of popping noises for the entertainment of the user. The graphics layer decorated the party favor and may include removable graphics including but not limited to stickers, posters, place mats, tattoos, banners, signs, game boards, cut-outs, or cling images.

15 Claims, 2 Drawing Sheets

NOISEMAKER PARTY FAVOR WITH REMOVABLE GRAPHICS

FIELD OF INVENTION

The present invention generally relates to amusement devices. More specifically, to party favors that integrate noise making articles and removable graphics for the purpose of proving amusement.

BACKGROUND OF THE INVENTION

Originally, party favors producing loud popping sounds used some kind of chemical explosive material. These required detonation by striking or lighting and posed some safety threat to the user. Used only to produce sound, they had no residual enjoyment value.

This problem has been partially solved by sound producing party favors that operate using contained air. However, the popping sound produced occurred only once and left no residual enjoyment value. In addition, they required manual dexterity to operate, eliminating very young users, who are unable to operate them effectively.

There are several patents related to noise making articles. A first patent is a paper novelty article described in U.S. Pat. No. 1,622,606 to A G Palmer. The disclosed article produced only one popping sound. A second patent discloses a noise-making strip described in U.S. Pat. No. 5,830,037 to Mastandra, Jr. that requires manipulation of a strip to produce a snapping sound. The printed message is not removable and is embodied within the noise-making strip. Due to the size of the strip, only very short messages can be printed.

Graphics are also widely used as party favors such as graphic sheets that have removable stickers attached. U.S. Pat. No. 5,639,523 to Ellis describes a decorative sheet material that incorporates bubble wrap for use in packaging. The function of the bubble wrap layer is to protect content inside an envelope or box made with said decorative material. This patent also specifically lists many materials that could be used as decoration, none of which include removable graphics.

An extremely useful and entertaining party favor for people of all ages can be created by combining a safe, child friendly noise making article with removable graphics for the purpose of providing a residual entertainment value after the noise making capability of said part favor is exhausted.

SUMMARY OF THE INVENTION

Accordingly, it is an object of this invention to allow for the production of loud celebratory popping sounds that can be generated without the use of hazardous chemicals or reactions.

It is another object that the sounds produced replicate that made by caps or other explosive materials such as fire crackers.

It is a further object that a multitude of popping sounds may be replicated in quick succession.

It is a further object that activation of the popping sounds are simply and easily activated by users of all ages and abilities, even the very young. Such a technique could include but is not limited to applying pressure (body weight) to a surface to produce said popping sounds.

It is a further object that activation of the popping sounds also provide sensory stimulation to the body.

It is yet a further object that the invention has a surface area that may incorporate a multitude of removable graphics.

It is still a further object of the invention that the removable graphics may include but not be limited to stickers. After the usefulness of the sound making capabilities are finished, said removable graphics may be saved to provide lasting enjoyment.

It is yet still a further object of the invention that the party favor may be constructed of recyclable materials.

It is still a further object that the invention can be easily and economically produced.

Further objects and advantages of the invention will become apparent from a consideration of the drawings and ensuing description

BRIEF DESCRIPTION OF THE DRAWINGS

The accompanying drawings, which are incorporated in and form a part of the specification, illustrate embodiments of the present invention and, together with the description, serve to explain the principles of the invention. In the drawings.

LIST OF REFERENCE NUMERALS IN DRAWINGS

In conjunction with the figures, the following list of the names of the parts of the present invention are noted:
100 a noise making cellular sheet material layer;
102 an adhesive layer;
104 a graphics layer;
206 a pull-tab;
308 a second graphics layer;
312 a second pull-tab;
314 a second adhesive layer; and
416 a protective layer.

DETAILED DESCRIPTION OF THE INVENTION

Figure 1:
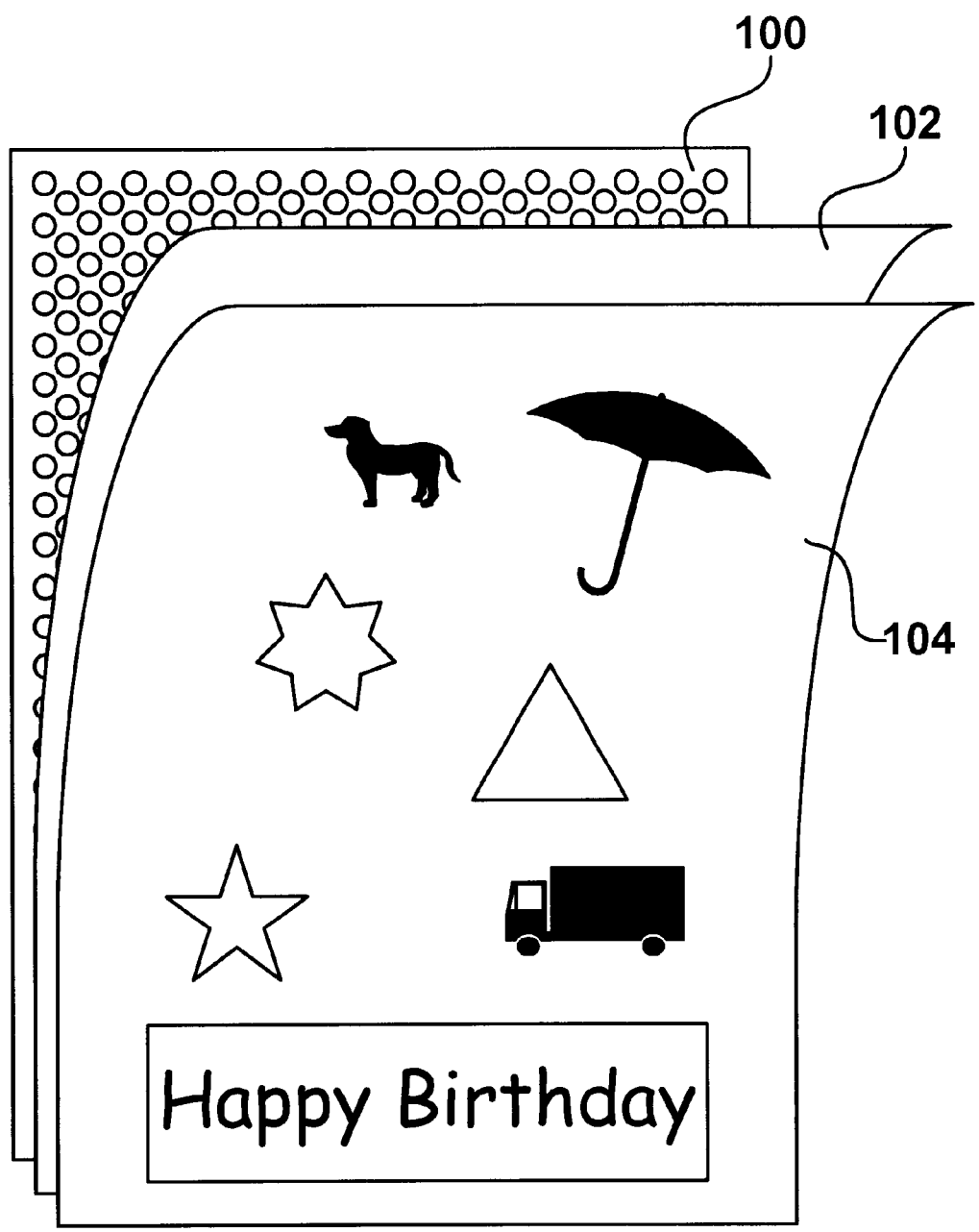
FIG. 1 is a perspective view of an embodiment of the present invention showing a graphics layer, an adhesive layer, and a layer of noise making cellular sheet material.
Figure 2:
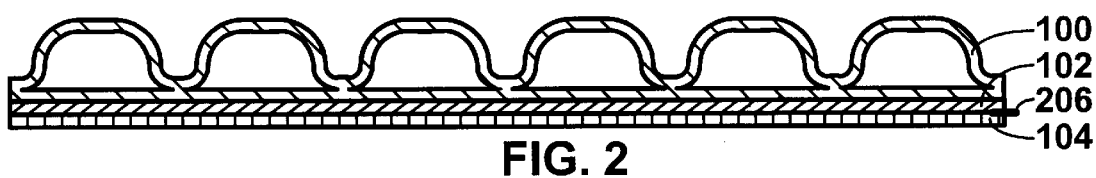
FIG. 2 is a cross-sectional view of an embodiment of the present invention showing a graphics layer, a pull-tab, an adhesive layer, and a layer of noise making cellular sheet material.
Figure 3:
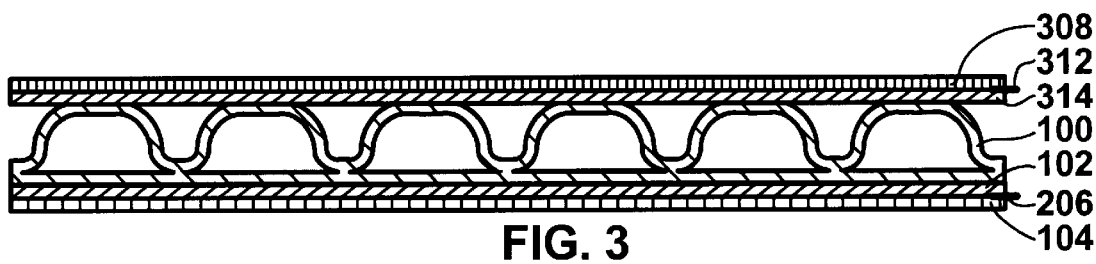
FIG. 3 is a cross-sectional view of an embodiment of the present showing a graphics layer, a pull-tab, an adhesive layer, and a layer of noise making cellular sheet material, a second adhesive layer, a second pull-tab, and second graphics layer.
Figure 4:
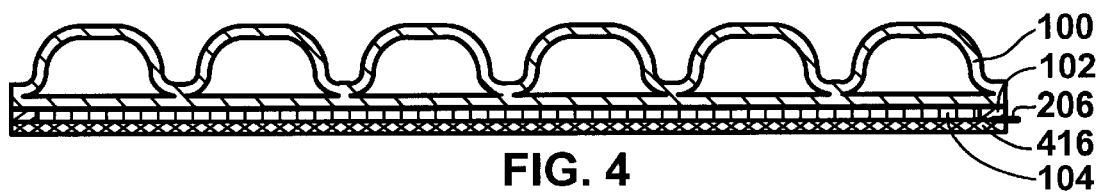
FIG. 4 is a cross-sectional view of an embodiment of the present invention showing an outer protective layer, a pull-tab, an adhesive layer, an encapsulated graphics layer, and a layer of noise making cellular sheet material.

In the following description, for the purposes of explanation, numerous specific details are set forth in order to provide a more thorough understanding of the present invention. FIGS. 1 and 2 illustrate a presently contemplated best mode for practicing the invention. FIGS. 3 and 4 illustrate examples of alternative embodiments. It will be apparent, however, to one skilled in the art that the present invention may be practiced without these specific details.

FIG. 1 is a perspective view of an embodiment of the present invention. It shows a party favor that is a lamination made of three layers, a noise making cellular sheet material layer (100), an adhesive layer (102) and a graphic layer (104). The noise making cellular sheet material layer (100) is provided to allow the production of noise making entertainment. Popping the cells in said noise making cellular sheet material (100) does this. Popping can be accomplished by multiple means including but not limited to laying the article on a hard surface and pressing firmly, and squeezing the cells between the digits of a hand. Variations on methods of popping the cells can create different sequences of sound with a minimum amount of required dexterity. It is a feature of this article that even a young child can pop cells and generate an entertaining sound. The cellular sheet material may be any material that traps air in pockets or bubbles in a sheet. The material may also be opaque, transparent, or semitransparent to suit the desired overall effect of the final part favor. An acceptable material would include but is not limited to Bubble-Wrap™.

The adhesive layer (102) has a first side and a second side. The first side of said adhesive layer (102) attaches by a first adhesive means to the noise making cellular sheet material (100) and the second side of the adhesive layer (102) attaches by a second adhesive means to the removable graphic layer (104). Each adhesive means may be any commercially available non-toxic adhesive. Each adhesive means may also have a varying amount of adhesion, depending upon the ease in which each attached layer is intended to be removed. For example, it may be desirable for the removable graphic layer (104) to pull apart from the composite lamination relatively easily, while it may not be desirable for the cellular sheet material to pull apart easily.

The graphic layer (104) has a backside and a front side. The backside of said graphic layer is laminated to the adhesive layer (102) by a second adhesive means. The front side of the graphic layer (104) may be decorated. Said graphic layer (104) may include but is not limited to stickers, posters, place mats, tattoos, banners, signs, game boards, cut-outs, and cling images. This graphic layer (104) may be removed from the rest of the party favor at any time, so that the user of the party favor may enjoy the value of said graphic layer, independent from the party favor as a whole.

FIG. 2 is a cross-sectional view of an embodiment of the present invention similar to that shown in FIG. 1. In addition to the noise making cellular sheet material (100), the adhesive layer (102), and the graphics layer (104), this embodiment also includes a pull-tab (206). Half of the pull-tab (206) is sandwiched between the adhesive layer (102) and the graphic layer (104) and the other half of the pull-tab (206) protrudes from the lamination. The purpose of the pull-tab (206) is to enable easy removal of the graphics layer (104) from the adhesive layer (102).

FIG. 3 is a cross-sectional view of an embodiment of the present invention similar to that shown in FIG. 2. In addition to the noise making cellular sheet material (100), the adhesive layer (102), the graphics layer (104), and the pull-tab (206), this embodiment also includes an second adhesive layer (314), a second graphic layer (308), and a second pull-tab (312). The additional items are laminated to the backside of the noise making cellular sheet material to produce a party favor with a graphic layer on each external surface of the lamination. As can be seen from FIG. 3, the order of the lamination for this embodiment is a graphics layer (104), a pull-tab (206), an adhesive layer (102), a noise making cellular sheet material layer (100), a second adhesive layer (314), a second pull-tab (312), and a second graphic layer (308).

FIG. 4 is a cross-sectional view of an alternative embodiment of the present invention wherein the graphic layer (104) is encapsulated between the layer of noise making cellular sheet material layer (100), and an outer protective layer (416). The outer protective layer (416) is adhered to the cellular sheet material layer (100) along the outer periphery of said noise making cellular sheet material layer (100), leaving a pocket large enough to accommodate and encapsulate the graphic layer (104).

The foregoing descriptions of the preferred embodiments of the invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as arc suited to the particular use contemplated. It is intended that the scope of the invention be defined by the claims appended hereto.

What is claimed is:

1. A party favor comprising a lamination further comprising:
   a) a noise making cellular sheet material layer having a front side, a back side, and a multitude of cells;
   b) an adhesive layer having a first side and a second side;
   c) a graphics layer having a front side and a back side, said adhesive layer laminated between said cellular sheet material and said graphics layer; and
   d) a pull-tab having a first half and a second half, said first half of said pull-tab laminated between said graphics layer and said adhesive layer, and said second half of said pull-tab protruding from said lamination.

2. A party favor as in claim 1 wherein said adhesive layer further comprises:
   a) a first adhesive means for securing said back side of said cellular sheet material layer to said first side of said adhesive layer; and
   b) a second adhesive means for securing said second side of said adhesive layer to said back side of said graphics layer.

3. A party favor as in claim 2 wherein said graphics layer may be removed from said lamination.

4. A party favor as in claim 3 wherein said graphics layer includes at least one graphic, said graphic selected from the group consisting of:
   a) a sticker;
   b) a poster;
   c) a place mat;
   d) a tattoo;
   e) a banner;
   f) a sign;
   g) a game board;
   h) a cut-out; and
   i) a cling image.

5. A party favor as in claim 4 further comprising:
   a) a second adhesive layer having a first side and a second side; and
   b) a second graphics layer having a front side and a back side;
   wherein said second adhesive layer is laminated between said front side of said cellular sheet material and said back side of said second graphics layer.

6. A party favor as in claim 5 further comprising:
   a) A third adhesive means for securing said back side of said cellular sheet material layer to said first side of said second adhesive layer; and b) a fourth adhesive means for securing said second side of said second adhesive layer to said back side of said second graphics layer.

7. A party favor as in claim 6 wherein said second graphics layer may be removed from said lamination.

8. A party favor as in claim 6 wherein said second graphics layer includes at least one second graphic, said second graphic selected from the group consisting of:

a) a sticker;

b) a poster;

c) a place mat;

d) a tattoo;

e) a banner;

f) a sign;

g) a game board;

h) a cut-out; and i) a cling image.

9. A party favor as in claim 8 further comprising a second pill-tab having a first half and a second half, said first half of said second pull-tab laminated between said second graphics layer and said second adhesive layer and said second half of said second pull-tab protruding from said lamination.

10. A party favor as in claim 1, wherein said graphics layer is an outer protective layer.

11. A party favor as in claim 10 wherein said outer protective layer may be opaque, translucent or transparent.

12. A party favor as in claim 11 wherein said adhesive layer further comprises an inner void large enough to encapsulate a third graphics layer, said third graphics layer encapsulated between said cellular sheet material layer and said outer protective layer.

13. A party favor as in claim 12 wherein said outer protective layer may be removed from said lamination, allowing for the free removal of said third graphics layer.

14. A party favor as in claim 13 wherein said third graphics layer includes at least one third graphic, said third graphic selected from the group consisting of:

a) a sticker;

b) a poster;

c) a place mat;

d) a tattoo;

e) a banner;

f) a sign;

g) a game board;

h) a cut-out; and i) a cling image.

15. A party favor as in claim 14 further comprising a pull-tab having a first half and a second half, said first half of said pull-tab laminated between said outer protective layer and said adhesive layer, and said half of said pull-tab protruding from said lamination.

* * * * *